US012667971B2

(12) United States Patent
Masumura et al.

(10) Patent No.: US 12,667,971 B2
(45) Date of Patent: Jun. 30, 2026

(54) ROBOTIC CONTROL OF OBJECT PLACEMENT

(71) Applicant: KABUSHIKI KAISHA YASKAWA DENKI, Kitakyushu (JP)

(72) Inventors: Ryo Masumura, Fukuoka (JP); Hiroki Tachikake, Fukuoka (JP); Keita Satsuma, Fukuoka (JP); Keisuke Nakamura, Fukuoka (JP); Hisashi Ideguchi, Fukuoka (JP)

( * ) Notice: Subject to any disclaimer, the term of this patent is extended or adjusted under 35 U.S.C. 154(b) by 11 days.

(21) Appl. No.: 18/822,489

(22) Filed: Sep. 3, 2024

(65) Prior Publication Data

US 2024/0424682 A1 Dec. 26, 2024

Related U.S. Application Data

(63) Continuation of application No. PCT/JP2022/022180, filed on May 31, 2022.
(Continued)

(51) Int. Cl.
*B25J 9/16* (2006.01)

(52) U.S. Cl.
CPC ............. *B25J 9/1697* (2013.01); *B25J 9/161* (2013.01); *B25J 9/163* (2013.01); *B25J 9/1653* (2013.01); *B25J 9/1664* (2013.01); *B25J 9/1679* (2013.01)

(58) Field of Classification Search
CPC . B25J 9/1697; B25J 9/161; B25J 9/163; B25J 9/1653; B25J 9/1664; B25J 9/1679; B25J 9/1671; B25J 13/00; B25J 13/08
See application file for complete search history.

(56) References Cited

U.S. PATENT DOCUMENTS 9,205,558 B1 12/2015 Zevenbergen et al.
2019/0291270 A1 9/2019 Kiyama
(Continued)

FOREIGN PATENT DOCUMENTS

EP 3616856 3/2020
EP 4390669 6/2024
(Continued)

OTHER PUBLICATIONS

International Search Report dated Aug. 9, 2022 for PCT/JP2022/022180.
(Continued)

*Primary Examiner* — Dylan M Katz
(74) *Attorney, Agent, or Firm* — SHIPWAY IP

(57) ABSTRACT

A robot control system comprising circuitry configured to acquire a designated area image showing a designated area, and execute image analysis on the designated area image to detect a current state of the designated area as a current area state. The circuitry is further configured to generate, based on the current area state, a state of the designated area which simulates one or more objects including an additional object as having been placed in the designated area, as a predicted area state. The circuitry is further configured to generate object information on the additional object which is simulated in the designated area, based on the predicted area state. The circuitry is further configured to control a robot so as to physically place the additional object in the designated area in accordance with the object information.

14 Claims, 9 Drawing Sheets

Related U.S. Application Data

(60) Provisional application No. 63/317,550, filed on Mar. 8, 2022.

(56) References Cited

U.S. PATENT DOCUMENTS

| | | | |
|---|---|---|---|
| 2020/0090099 A1 | 3/2020 | Johnson et al. | |
| 2021/0129319 A1 * | 5/2021 | Kaneko | B25J 9/163 |
| 2021/0302447 A1 | 9/2021 | Natsume et al. | |
| 2021/0402441 A1 * | 12/2021 | Fischer | B07C 5/02 |
| 2022/0234196 A1 | 7/2022 | Tachikake | |
| 2022/0297958 A1 * | 9/2022 | Moreno | B25J 13/08 |

FOREIGN PATENT DOCUMENTS

| | | |
|---|---|---|
| JP | H9-262784 | 10/1997 |
| JP | 2002-052487 | 2/2002 |
| JP | 2013-195199 | 9/2013 |
| JP | 2017-520417 | 7/2017 |
| JP | 2019-162712 | 9/2019 |
| JP | 2020-032479 | 3/2020 |
| JP | 6758540 | 9/2020 |
| JP | 2020-179464 | 11/2020 |
| JP | 2020179464 A * | 11/2020 |
| JP | 2021-030407 | 3/2021 |
| JP | 6860432 | 4/2021 |
| JP | 2021-153534 | 10/2021 |
| JP | 7094502 | 7/2022 |
| WO | 2016/010968 | 1/2016 |
| WO | 2021/085345 | 5/2021 |
| WO | 2023/021681 | 2/2023 |

OTHER PUBLICATIONS

International Preliminary Report on Patentability with Written Opinion dated Sep. 19, 2024 for PCT/JP2022/022180.
Office Action issued in Japanese Patent Application No. P2022-567793, dated Feb. 28, 2023 (with English partial translation).

* cited by examiner

ROBOTIC CONTROL OF OBJECT PLACEMENT

CROSS-REFERENCE TO RELATED APPLICATIONS

This application is a continuation application of PCT Application No. PCT/JP2022/022180, filed on May 31, 2022, which claims the benefit of priority from U.S. Provisional Patent Application No. 63/317,550, filed on Mar. 8, 2022. The entire contents of the above listed PCT and priority applications are incorporated herein by reference.

BACKGROUND

Field

One aspect of the present disclosure relates to a robot control system, a robot control method, a robot control program, and an estimation system.

Description of the Related Art

A robot system is known that picks a particular object from a set of objects piled in bulk.

Japanese Patent No. 6758540 describes a device including a robot having a gripping mechanism, a controller for controlling the robot, a sensor for outputting measurement data of a workpiece, and a computer that determines a gripping position posture to be taken by the gripping mechanism by inputting the measurement data to a gripping evaluation model for evaluating stability of gripping for the gripping position posture and outputs information of the determined gripping position posture to the controller.

Japanese Patent No. 6860432 describes a workpiece recognition device for recognizing a workpiece in an installation space in which a plurality of workpieces are placed. The recognition device includes an imaging device for capturing an image within a predetermined range of the installation space to acquire image information, and a control unit for analyzing the image information to recognize the workpiece. The control unit controls a robot for holding and taking out the workpiece from the predetermined range of the installation space.

SUMMARY

A robot control system according to an aspect of the present disclosure includes circuitry configured to: acquire, from an imaging device that images a designated area in which at least one object is to be placed, a designated area image showing the designated area; execute image analysis on the designated area image to detect a current state of the designated area as a current area state; generate, based on the current area state, a state of the designated area which simulates one or more objects including an additional object as having been placed in the designated area, as a predicted area state; generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information.

A method for controlling a robot according to an aspect of the present disclosure includes: acquiring, from an imaging device that images a designated area in which at least one object is to be placed, a designated area image showing the designated area; executing image analysis on the designated area image to detect a current state of the designated area as a current area state; generating, based on the current area state, a state of the designated area which simulates one or more objects including an additional object as having been placed in the designated area, as a predicted area state; generating object information on the additional object which is simulated in the designated area, based on the predicted area state, wherein the object information indicates a position or a posture of the additional object in the predicted area state; and controlling a robot so as to physically place the additional object in the designated area in accordance with the position or the posture indicated by the object information.

A non-transitory computer-readable storage medium according to an aspect of the present disclosure stores processor-executable instructions to: acquire, from an imaging device that images a designated area in which at least one object is to be placed, a designated area image showing the designated area; execute image analysis on the designated area image to detect a current state of the designated area as a current area state; generate, based on the current area state, a state of the designated area which simulates one or more objects including an additional object as having been placed in the designated area, as a predicted area state; generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information.

DETAILED DESCRIPTION

Figure 1:
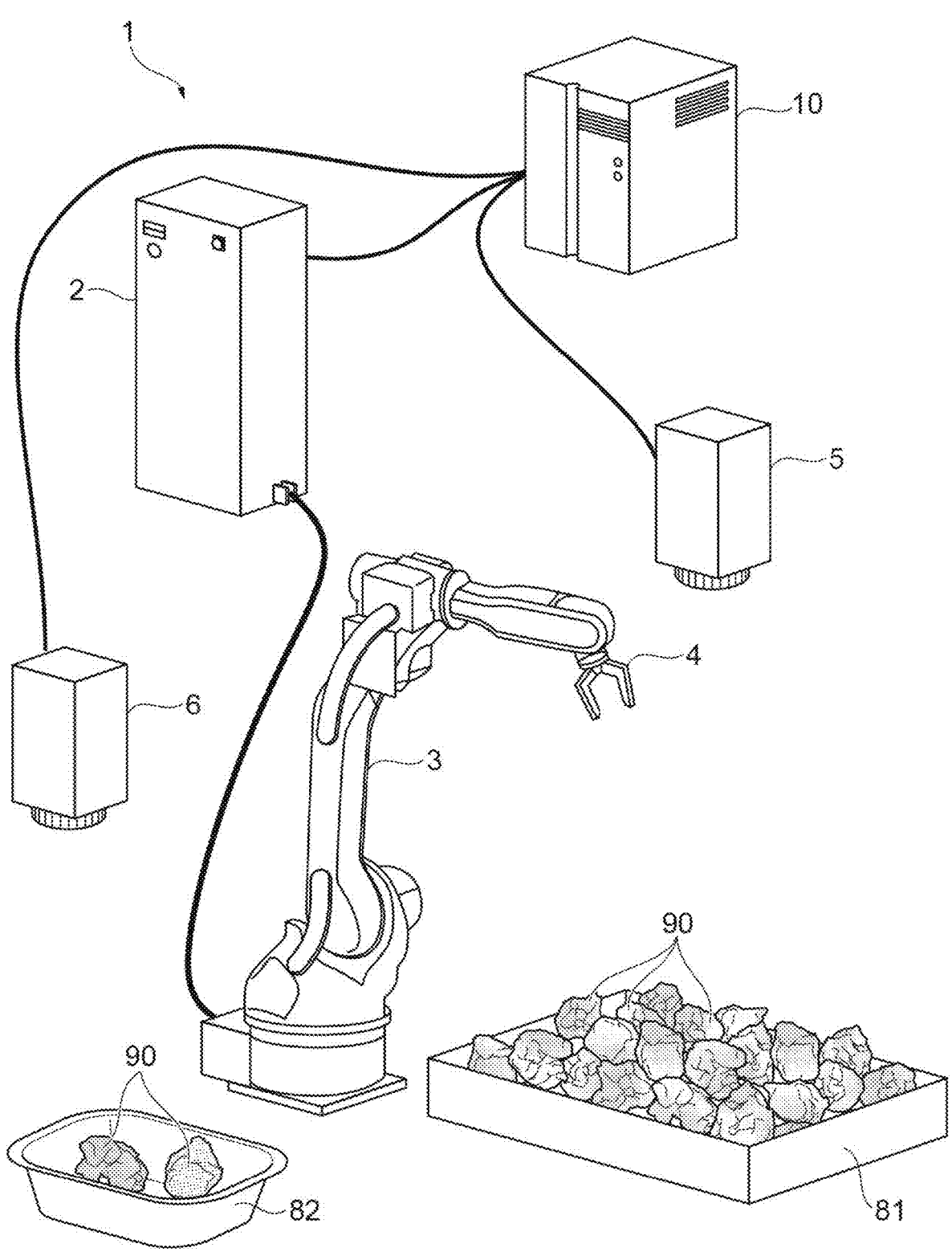
FIG. 1 is a diagram showing an example of a robot system.

In the following description, with reference to the drawings, the same reference numbers are assigned to the same components or to similar components having the same function, and overlapping description is omitted.

Outline of System

A robot system according to the present disclosure is a control system that automatically places one or more objects in a designated area by causing a robot located in a real working space to perform predetermined motions. The robot system includes at least one robot and a robot control system for controlling the robot. In some examples, the robot system repeats a series of processes of taking out one object or a group of objects from a stock area containing a set of objects, as an additional object, and placing the additional object in the designated area, thereby placing a predetermined amount of objects in the designated area. In the present disclosure, a group of objects is also referred to as "an object".

The object refers to a tangible object to be processed by the robot system, for example, any solid or liquid. The object may be a tangible object which is clearly distinguished from another object and able to be managed by the number of pieces. The tangible object that is able to be managed by the number of pieces may be a fixed-shape object in which the type of each object is the same and the visual impression given to the observer is also the same among the objects. Alternatively, the tangible objects that is able to be managed by the number of pieces may be an irregular shaped object in which the type of each object is the same but the visual impression given to the observer is different among the objects. Alternatively, the object may be a tangible object that is managed by mass as it is quite difficult or virtually impossible to manage by number. Regarding the tangible object managed by mass, one object (a group of objects) is obtained by being separated from the remaining part by a predetermined delimiting operation. Examples of the tangible object managed by the mass include a granular or powdery material, a finely cut material, a material provided as a paste, and a liquid material. The additional object is an object to be placed in the designated area.

The designated area refers to a section in which at least one object is placed by the robot, and has a predetermined shape and volume or square measure. To "place an object in the designated area" refers to a process of putting an object in the designated area, and may also refer to a process of making an object exist in a designated area. The robot system may place the object in an empty designated area, or may place the object in a designated area that has already contained something.

The stock area is a section in which a set of objects that may be placed in the designated area is prepared, and has a predetermined shape and volume or square measure. In some examples, the stock area is a section in which a set of objects is piled in bulk. In the present disclosure, an object that is prepared in the stock area and may be placed in the designated area (that is, a candidate for the additional object) is also referred to as a candidate object. The stock area may contain a set of objects (candidate objects) of one kind or may contain a set of objects (candidate objects) of multiple kinds. Therefore, in a case where the process of placing the additional object is repeated with respect to one designated area, the robot may place the same type of additional object in each placement process, or may place different types of additional objects in different placement processes.

As described above, the robot system may repeat the process of placing the additional object in the designated area until the predetermined amount of objects is contained in the designated area. The predetermined amount refers to a value set as a total amount of objects contained in the designated area. The predetermined amount of objects is a set of one or more objects. For the objects managed by mass, a set of two or more objects may appear as a group. An allowable error may occur between the predetermined amount and an actual total amount of objects finally contained in the designated area. The predetermined amount may be indicated by a specific numerical value, or may be indicated by a numerical value range. The predetermined amount may be defined by number, mass, or volume, or a combination of at least two of these amounts.

In some examples, the robot system handles a food item as the object. For example, the robot system places a particular food item in a food container into a pack (i.e., case), such as a lunch box. The food container is an example of the stock area, and the pack is an example of the designated area. That is, the arrangement of the food item(s) in the pack is an example of placing the object in the designated area. The robot system may process various types of food items such as delicatessen (fried food, stir-fried vegetables, potato salad, etc.), breads, rice, soup, juice, source, dressing, salt, pepper, etc., or a combination of these food items, as the objects. In the example of arranging the food item in the pack, to "place an object in the designated area" may be placing a solid object in the pack, or may be sprinkling a liquid, powder or granular seasoning.

Configuration of System

FIG. 1 is a diagram showing an example of an overall configuration of a robot system 1 according to an example. The robot system 1 includes a motor control device 2, a robot 3, a first camera 5, a second camera 6, and a robot controller 10. In some examples, the robot controller 10 connects to the motor control device 2, the first camera 5, and the second camera 6 via a communication network. The motor control device 2 connects to the robot 3 via another communication network. The communication network connecting the devices may be a wired network or a wireless network. The communication network may be configured to include at least one of the Internet and an intranet, or may be simply realized by one communication cable.

FIG. 1 shows a food container and a pack as a stock area 81 and a designated area 82 present in the real working space, respectively. The food container is a carrying container mainly used in the food industry, and has a volume capable of containing a certain amount of food. The pack has dimensions suitable for the sale of food products to general consumers.

The motor control device 2 is a device for causing an output of a motor of the robot 3 to follow a control signal (that is, a command) from the robot controller 10. The motor control device 2 generates electric power for moving the motor based on the control signal from the robot controller 10 and supplies the electric power to the motor. The supplied electric power corresponds to a driving force command such as a torque command, a current command, or the like. The motor control device 2 may be, for example, an inverter or a servo amplifier. The motor control device 2 may be incorporated into the robot 3. The motor control device 2 may include a sensor that detects a response of the motor control device 2. The robot 3 is a device that receives power and performs a predetermined operation according to a purpose, thereby performing a useful work. In some examples, the robot 3 includes a plurality of joints and performs various processes using an end effector 4 attached to a tip portion. The joint is an example of a driven object. A joint axis is set for each of the plurality of joints. Some components of the robot 3, such as an arms, a pivot, etc., rotate about the joint axis, so that the robot 3 may freely change the position and posture of the tip portion within a predetermined range. In some examples, the robot 3 is a multi-axis serial-link vertical articulated robot. The robot 3 may be a six-axis vertical articulated robot or may be a seven-axis vertical articulated robot in which one redundant axis is added to the six axes. The robot 3 may be a self-propelled movable robot, for example, a robot supported by an automatic guided vehicle (AGV). Alternatively, the robot 3 may be a stationary robot fixed at a predetermined location.

The robot 3 is driven by at least one motor. The motor is a device that generates a driving force for driving a driven object of the robot 3 according to the electric power supplied from the motor control device 2. Each motor operates each driven object, which results in the robot 3 performing a predetermined task on a workpiece with the end effector 4. The motor may be a rotary motor that rotates a driven object or a linear motor that moves a driven object along a straight line. The motor may be a synchronous motor or an induction motor. The motor may be a permanent-magnet-type synchronous motor such as a surface permanent magnet (SPM) motor or an interior permanent magnet (IPM) motor. The motor may be a synchronous electric motor without a permanent magnet, such as a synchronous reluctance motor. The motor may be a DC motor or an AC motor.

The robot 3 may include at least one sensor that is a device for detecting a response of a the robot 3 operated by the electric power from the motor control device 2. The response is an output of the robot with respect to a command which is an instruction for controlling the robot. For example, the response indicates information on at least one of a motion and a state of the robot 3. The response may indicate information on at least one of a motion and a state of the motor. In a case where the motor is a rotary type, a rotation angle of the driven object by the motor corresponds to the "position", and a rotation velocity of the driven object by the motor corresponds to the "velocity". The response may indicate information on at least one of a motion and a state of the driven object, for example, at least one of a position, a velocity, and a force of the driven object. The sensor transmits a response signal indicating the response to the robot controller 10. The response may be a value itself obtained by the sensor, or may be represented by a value calculated or processed by a given calculation or algorithm. An example of the sensor is a rotary encoder that outputs a pulse signal having a frequency proportional to the operating velocity of the motor. The rotary encoder may acquire both the position and velocity of the motor.

The end effector 4 is a device that acts on the object. For example, the end effector 4 is used to move the object from the stock area to the designated area, or to adjust at least one of a position and a posture of the object in the designated area. Examples of the end effector 4 include a gripper, a suction hand, a spoon, and a brush. The end effector 4 to be attached to the robot 3 is selected according to the type of the object.

The first camera 5 is an imaging device for imaging the stock area 81. In some examples, the first camera 5 is provided above the stock area 81 such that a plan view of the stock area 81 may be captured. Hereinafter, an image obtained by the first camera 5 and showing the stock area 81 is referred to as a stock area image. The first camera 5 transmits the stock area image generated by the imaging to the robot controller 10.

The second camera 6 is an imaging device for imaging the designated area 82. In some examples, the second camera 6 is provided above the designated area 82 such that a plan view of the designated area 82 may be captured. Hereinafter, the image obtained by the second camera 6 and showing the designated area 82 is referred to as a designated area image.

The second camera 6 transmits a designated area image generated by the imaging to the robot controller 10.

Figure 2:
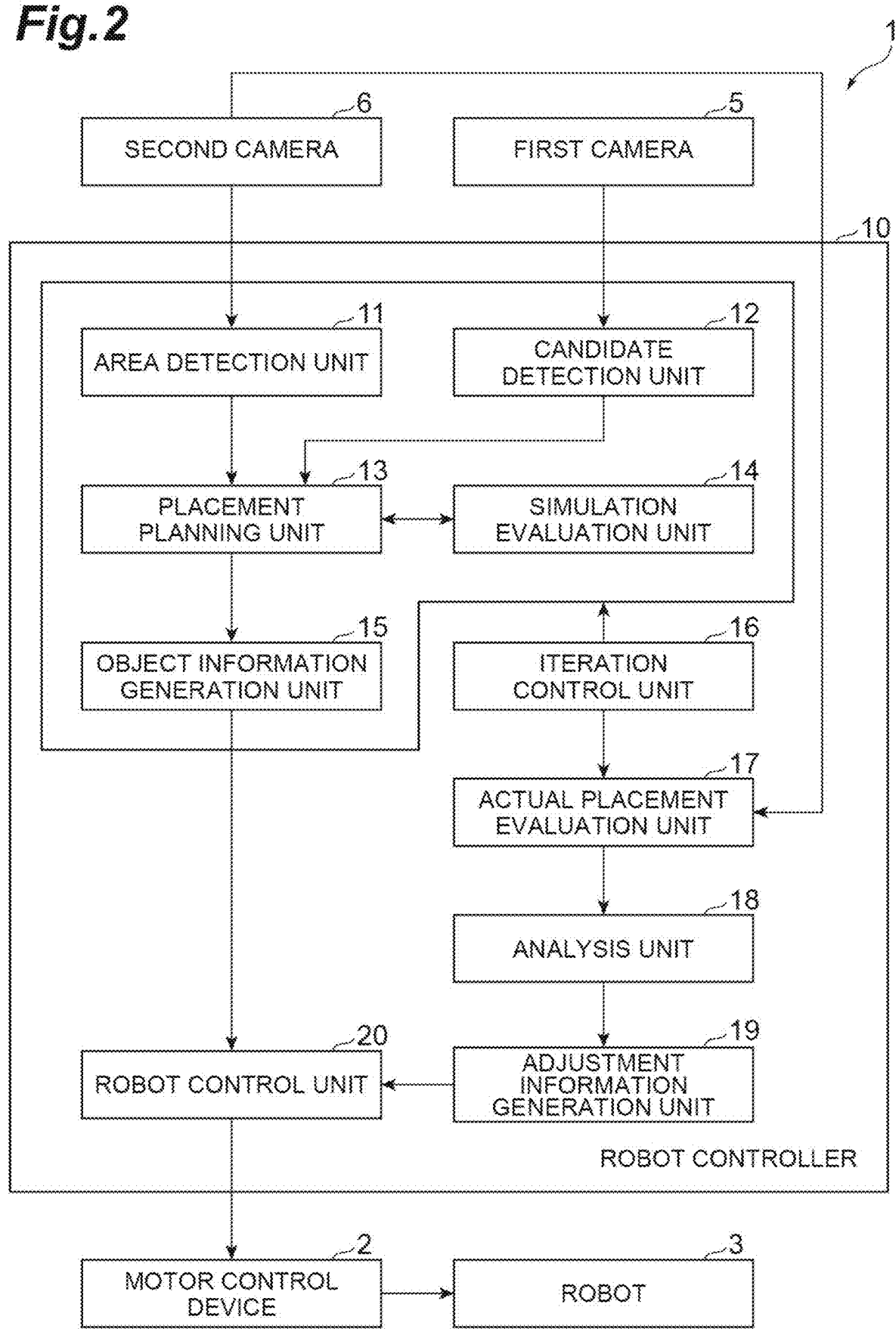
FIG. 2 is a diagram showing an example of a functional configuration of a robot controller.

The robot controller 10 is a device that outputs a control signal (command) for operating the robot 3. The robot controller 10 is an example of the robot control system according to the present disclosure. FIG. 2 is a diagram showing an example of a functional configuration of the robot controller 10. In this example, the robot controller 10 includes an area detection unit 11, a candidate detection unit 12, a placement planning unit 13, a simulation evaluation unit 14, an object information generation unit 15, an iteration control unit 16, an actual placement evaluation unit 17, an analysis unit 18, an adjustment information generation unit 19, and a robot control unit 20 as functional modules.

The area detection unit 11 is a functional module that detects a current state of the designated area 82 as a current area state. The area detection unit 11 processes the designated area image acquired from the second camera 6 to detect the current area state.

The candidate detection unit 12 is a functional module that detects a plurality of candidate objects (i.e., a set of candidate objects) in the stock area 81. The candidate detection unit 12 processes the stock area image acquired from the first camera 5 to detect the plurality of candidate objects in the stock area 81. In some examples, the candidate detection unit 12 includes a quality inference engine trained in advance and uses the quality inference engine to determine qualities of individual candidate objects.

The placement planning unit 13 is a functional module that simulates a state of the designated area 82 in which at least an additional object has been placed, as a predicted area state. That is, the placement planning unit 13 generates a state of the designated area which simulates one or more objects including the additional object as having been placed in the designated area, as the predicted area state. The placement planning unit 13 executes the simulation based at least on the current area state to plan the placement of the additional object. The simulation refers to a process of representing the behavior of a certain system on a computer in a simulated manner. The predicted area state is not a real state but a virtual state, and is a future state of the designated area 82 that may actually occur. The placement planning unit 13 simulates at least one predicted area state, for example, simulates a plurality of predicted area states.

The simulation evaluation unit 14 is a functional module that evaluates each of the plurality of predicted area states simulated by the placement planning unit 13. The evaluation result is referred to in order to select one from the plurality of predicted area states. In some examples, the simulation evaluation unit 14 includes a placement inference engine trained in advance and uses the placement inference engine to evaluate individual predicted area states (i.e., virtual placements of objects in the designated area 82 generated by the simulation).

The object information generation unit 15 is a functional module that generates object information (or additional object information) on the additional object which is simulated in the designated area, based on the predicted area state. Since the predicted area state reflects the current area state, the object information generation unit 15 may be regarded as a functional module that generates the object information based on the current area state. The object information is information for causing the robot 3 to place the additional object in the designated area 82, and is referred to by the robot control unit 20 as will be described later.

The iteration control unit 16 is a functional module that repeats the placement of an additional object in the designated area 82 such that a predetermined amount of objects is placed in the designated area 82. In some examples, in response to the robot 3 placing one additional object in the designated area 82, the iteration control unit 16 causes the module group consisting of the area detection unit 11, the candidate detection unit 12, the placement planning unit 13, the simulation evaluation unit 14, and the object information generation unit 15 to execute a series of processes for placing a next additional object.

The actual placement evaluation unit 17 is a functional module that evaluates a final state that is a real state of the designated area 82 in which the predetermined amount of objects has been placed. The evaluation result is referred to in order to determine whether to fix or adjust the placement of the predetermined amount of objects. In some examples, the actual placement evaluation unit 17 includes the placement inference engine in common with the simulation evaluation unit 14 and uses the placement inference engine to evaluate the final state.

The analysis unit 18 is a functional module that analyzes a calculation process of the placement inference engine used by the actual placement evaluation unit 17 and extracts an area of interest indicating the basis of the evaluation of the final state by the placement inference engine. This area of interest is referenced to adjust the placement of the predetermined amount of objects in the designated area 82.

The adjustment information generation unit 19 is a functional module that generates adjustment information for changing at least one of a position and a posture of at least part of the predetermined amount of objects in the designated area 82, based on the final state of the designated area 82, such that the evaluation result by the actual placement evaluation unit 17 increases. The adjustment information is information for causing the robot 3 to perform the change, and is referred to by the robot control unit 20.

The robot control unit 20 is a functional module that controls the robot 3 based on the object information or adjustment information. The robot control unit 20 controls the robot 3 so as to physically place the additional object in the designated area 82, based on the object information. Further, the robot control unit 20 controls the robot 3 so as to physically change at least one of the position and posture of at least part of the predetermined amount of objects in the designated area 82, based on the adjustment information.

Figure 3:
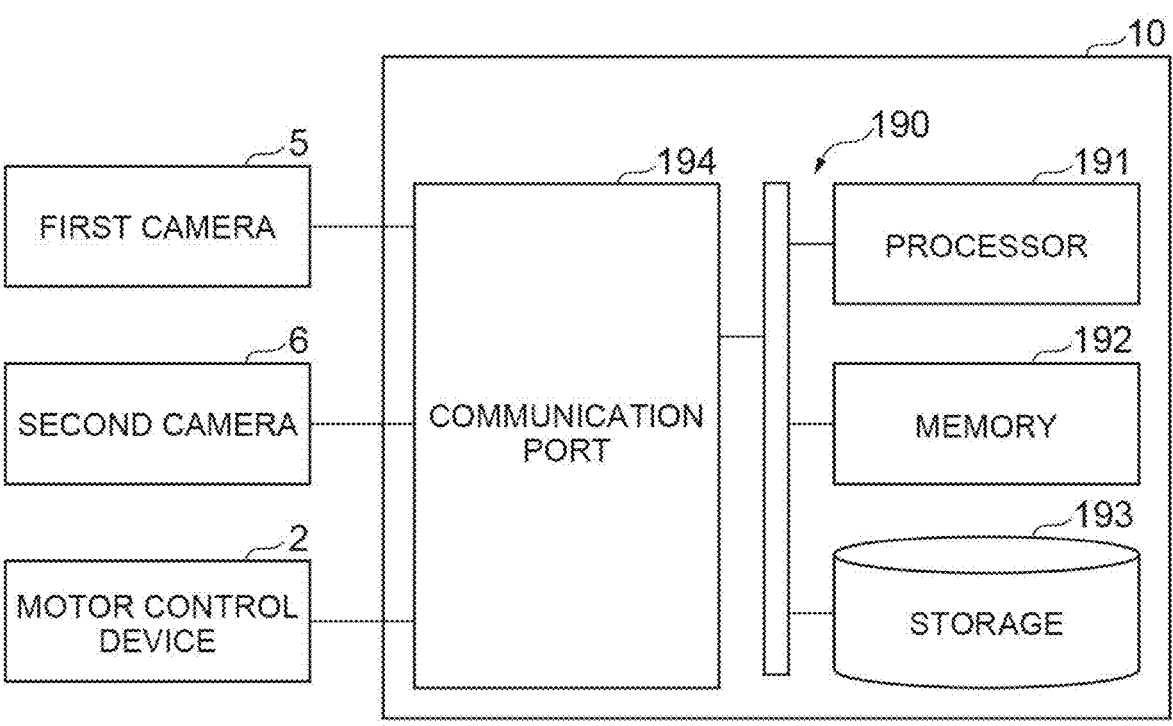
FIG. 3 is a diagram showing an example of a hardware configuration of the robot controller.

FIG. 3 is a diagram showing an example of a hardware configuration of the robot controller 10. The robot controller 10 comprises circuitry 190. In some examples, the circuitry 190 comprises at least one processor 191, a memory 192, a storage 193, and at least one communication port 194. The storage 193 is a non-volatile storage media, and stores a robot control program for realizing each of the functional modules described above. The storage 193 is constituted by, for example, at least one hard disk or nonvolatile memory. The memory 192 temporarily stores a robot control program loaded from the storage 193, a calculation result by the processor 191, and the like. The memory 192 is constituted by, for example, at least one random access memory. The processor 191 realizes each functional module by executing the robot control program in cooperation with the memory 192. The communication port 194 performs data communication with another device in accordance with commands from the processor 191. For example, the robot controller 10 has individual communication ports 194 for the motor control device 2, first camera 5, and second camera 6.

The robot control program includes code for implementing each functional module of the robot controller 10. The processor 191 operates the communication port 194 in accordance with the robot control program, and reads and writes data in the memory 192 or the storage 193.

The robot control program may be provided in a state of being fixedly recorded in a non-transitory storing medium such as a CD-ROM, a DVD-ROM, or a semiconductor memory. Alternatively, the robot control program may be provided as a data signal superimposed on a carrier wave via a communication network.

Inference Engine

Each of the quality inference engine and the placement inference engine is a calculation model that receives a given input image and outputs an estimated value for a subject of the input image. These inference engines may be machine learning models constructed by a neural network such as a convolutional neural network (CNN), and in this case, each inference engine is generated in advance by machine learning. The machine learning refers to a method of autonomously finding out a law or rule by repeatedly learning based on given information. In some examples, the inference engine is constructed using an algorithm and a data structure. It should be noted that the inference engine generated by the machine learning is a calculation model that is estimated to be optimal, and is not necessarily a "calculation model that is actually optimal".

A learning device generates the inference engine by executing the machine learning using training data indicating a plurality of combinations of an input image and a ground truth of an estimated value. The learning device inputs the input image into a given machine learning model and obtains an estimated value output from the machine learning model. The learning device executes the back propagation based on an error between the estimated value and the ground truth to update parameters in the machine learning model. The learning device obtains the inference engine by repeating the training until a given termination condition is met.

In an example of generating the quality inference engine, an object image showing at least one object is prepared as the input image, and an evaluation value of quality is set as the ground truth for each of the at least one object. The evaluation value of quality may be represented by a value indicating a classification such as "good" and "bad" or may be represented by a continuous value in a given range (for example, a value between 0 and 1). The evaluation value of quality may be set based on an attribute of the object, and for example, may be set based on at least one of a shape, a size, and a color of the object.

In an example of generating the placement inference engine, a placement image showing the designated area in which at least one object has been placed is prepared as the input image, and an evaluation value of the placement is set as the ground truth. In the present disclosure, the state of the designated area represented in the placement image is referred to as a post-placement area state, which is distinguished from the current area state and the final state handled by the robot controller 10. In some examples, the post-placement area state is a state in which the predetermined amount of objects has been placed in the designated area. The evaluation value of placement of object may be represented by a value indicating a classification such as "good" and "bad" or may be represented by a continuous value in a given range (for example, a value between 0 and 1). The evaluation value of placement may be set based on a balance of the placement, for example, may be set so as to increase as the empty portion in the designated area decreases. Alternatively, the evaluation value of placement may be set based on a balance of shapes, sizes, or colors between objects in the designated area. The color balance may be a balance of colors represented by a plurality of grades.

As described above, the generated placement inference engine may be used in both the simulation evaluation unit 14 and the actual placement evaluation unit 17. Alternatively, the placement inference engine of the simulation evaluation unit 14 and the placement inference engine of the actual placement evaluation unit 17 may be generated by the machine learning independent from each other.

Each of the object image and the placement image may be a real image showing a real object or an image artificially generated by a computer. For example, the object image or the placement image may be generated by processing at least part of a real image by a computer. In general, it is necessary to prepare a large amount of training data for the machine learning, but it takes a lot of effort and time to prepare a large number of images. Sufficient training data may be efficiently prepared by artificially generating the object images or the placement images. For example, such artificial images may be generated by techniques such as a Generative Adversarial Networks (GAN) model, the ray tracing, the photorealistic rendering, etc.

The generation of the quality inference engine or the placement inference engine by the learning device corresponds to the learning phase, and the use of the quality inference engine or the placement inference engine corresponds to the operation phase. The inference engine is portable between computer systems. Therefore, the robot controller 10 may use the quality inference engine or the placement inference engine generated by another computer system. The learning device may be incorporated into the robot system 1 or the robot controller 10.

Robot Control Method

Figure 4:
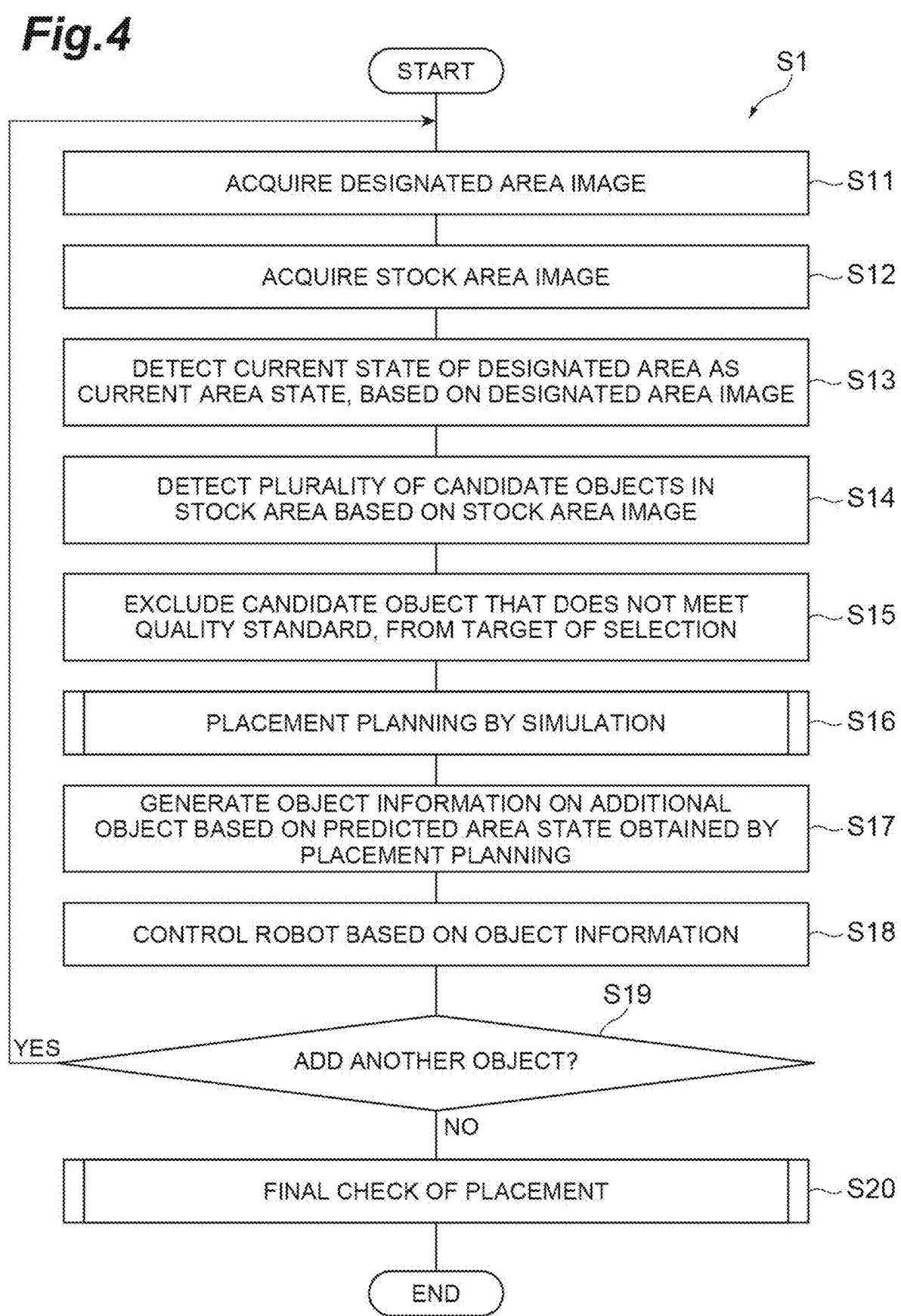
FIG. 4 is a flowchart showing an example of processing in the robot system.
Figure 5:
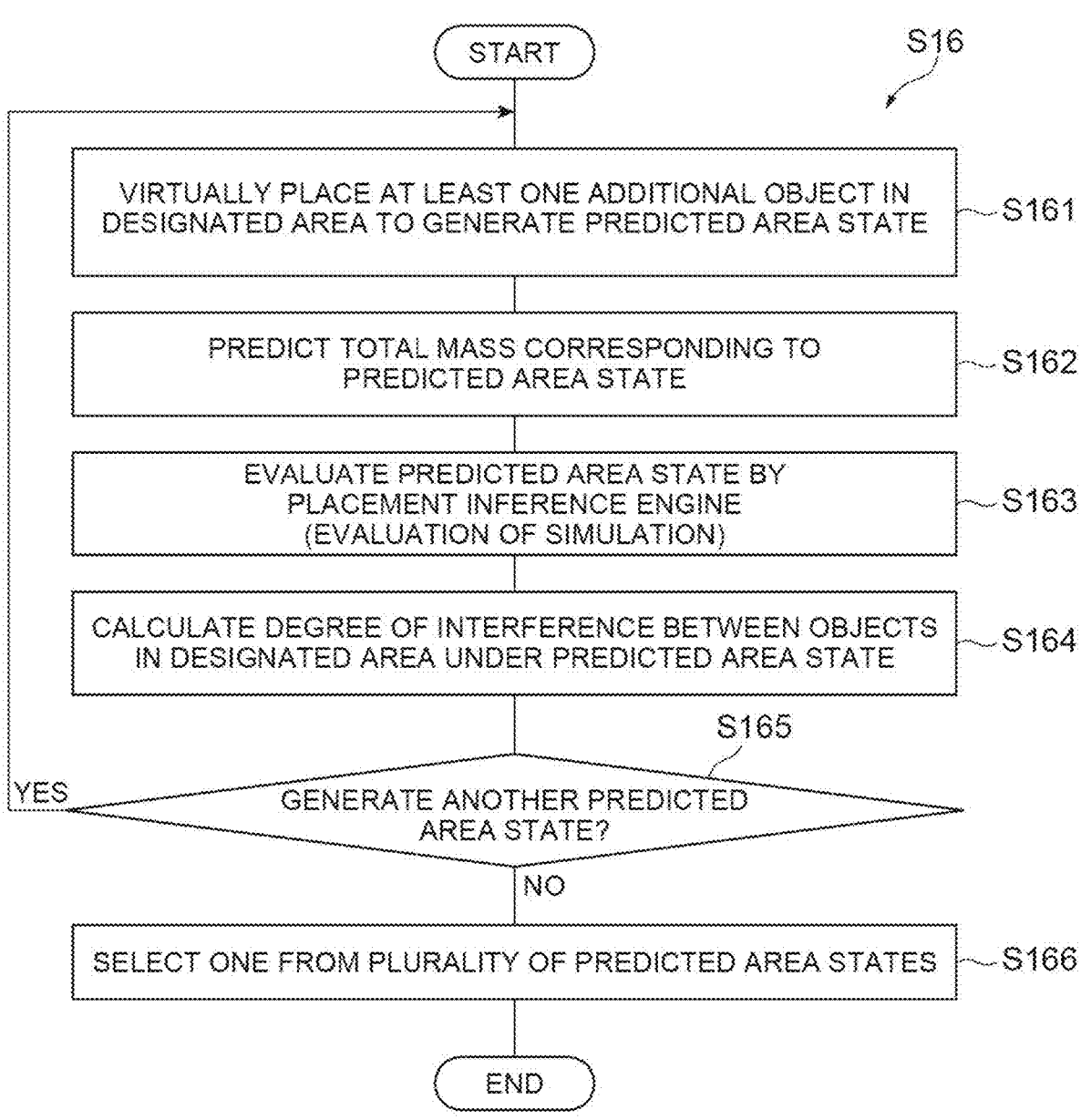
FIG. 5 is a flowchart showing placement planning by simulation.
Figure 6:
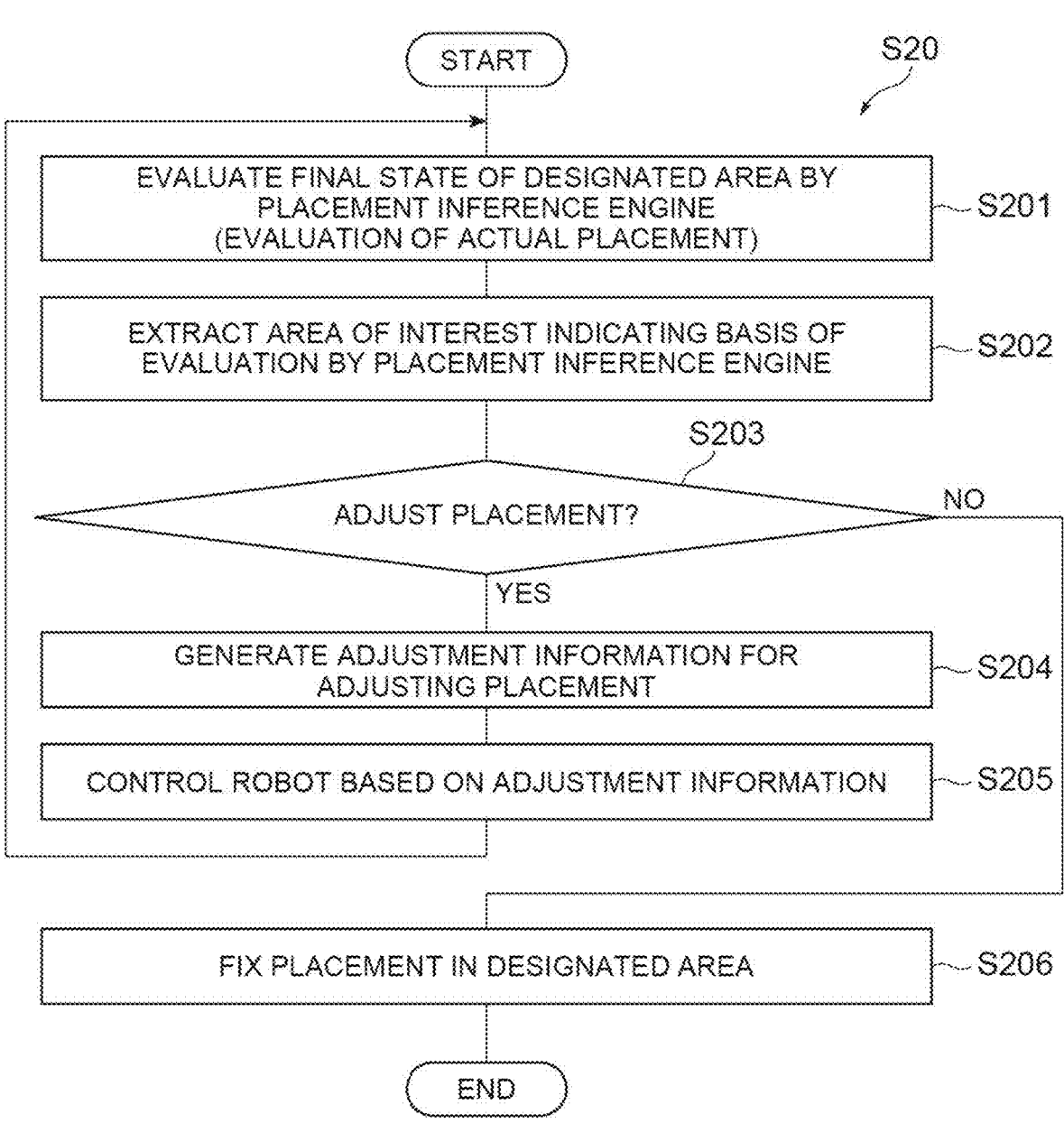
FIG. 6 is a flowchart showing an example of a final check of placement in a designated area.

As an example of the robot control method according to the present disclosure, an example of a processing procedure executed by the robot system 1 (or the robot controller 10) will be described with reference to FIGS. 4 to 6. FIG. 4 is a flowchart showing an example of processing in the robot system 1 as a processing flow S1. That is, the robot system 1 performs the processing flow S1. FIG. 5 is a flowchart showing an example of placement planning by the simulation. FIG. 6 is a flowchart showing an example of a final check of placement in the designated area 82. In some examples, the robot system 1 (or the robot controller 10) executes the processing flow S1, optionally with reference to a predetermined amount input from a user or another system.

In step S11, the area detection unit 11 acquires a designated area image that shows the current designated area 82, from the second camera 6. The designated area image may be a still image or one frame image constituting a video image. Alternatively, the designated area image may be a depth image or a set of an RGB image and a depth image.

In step S12, the candidate detection unit 12 acquires a stock area image that shows the current stock area 81, from the first camera 5. The stock area image may be a still image or one frame image constituting a video image. Alternatively, the stock area image may be a depth image or a set of an RGB image and a depth image.

In step S13, the area detection unit 11 detects a current state of the designated area 82 as the current area state, based on the designated area image. The area detection unit 11 executes image analysis on the designated area image to detect the current area state. In some examples, the area detection unit 11 detects at least one of an outline, a position, or a posture of each object in the designated area 82 and an empty portion in the designated area 82, as the current area state. It may also be said that the posture of the object is the direction of the object. In some examples, the area detection unit 11 recognizes the individual objects or the empty portion in two- or three-dimensional shapes.

In step S14, the candidate detection unit 12 detects a plurality of candidate objects in the stock area 81 based on the stock area image. The candidate detection unit 12 executes image analysis on the stock area image to detect the plurality of candidate objects. In a case of processing objects managed by mass, the candidate detection unit 12 may divide a section occupied by candidate objects in the stock area 81 based on the amount of additional objects to virtually generate a plurality of divided areas, and detect each divided area as the candidate object. In some examples, the area detection unit 11 recognizes the individual objects as two- or three-dimensional shapes.

In some examples, the candidate detection unit 12 detects an attribute and a picking point for each candidate object. The attribute of the candidate object refers to information indicating a feature or a property of the candidate object, and is, for example, at least one of an outline (that is, a shape and a size), a color, quality, and mass. The candidate detection unit 12 may represent the color by a plurality of grades (e.g., five grades). The candidate detection unit 12 may input the stock area image into the quality inference engine to determine the evaluation value of quality for each candidate object. The candidate detection unit 12 may estimate the volume of the candidate object based on the number of pixels representing the candidate object, and multiply a predetermined density by that volume to predict the mass of the candidate object. The picking point refers to a position of the candidate object that comes into contact with the end effector 4 when the candidate object is transferred from the stock area 81 to the designated area 82 as the additional object. The candidate detection unit 12 may determine the picking point based on the centroid of the candidate object. Alternatively, the candidate detection unit 12 may input the stock area image into a given inference engine (machine learning model) generated by machine learning to obtain the picking point for each candidate object. The candidate detection unit 12 may detect a picking point existing within the movable range of the end effector 4 or detect a picking point that does not cause interference between the end effector 4 and another candidate object.

In step S15, the candidate detection unit 12 excludes a candidate object that does not meet the quality standard, i.e., a substandard object, from the target of selection. The candidate detection unit 12 determines, for each of the detected candidate objects, whether the quality of the candidate object meet a predetermined quality standard. The candidate detection unit 12 excludes a candidate object that does not meet the quality standard from a target to be selected as the additional object and maintains a candidate object that meets the quality standard as the target to be selected as the additional object. That is, the candidate detection unit 12 determines which of the plurality of candidate objects has a quality that meets the predetermined quality standard.

Figure 7:
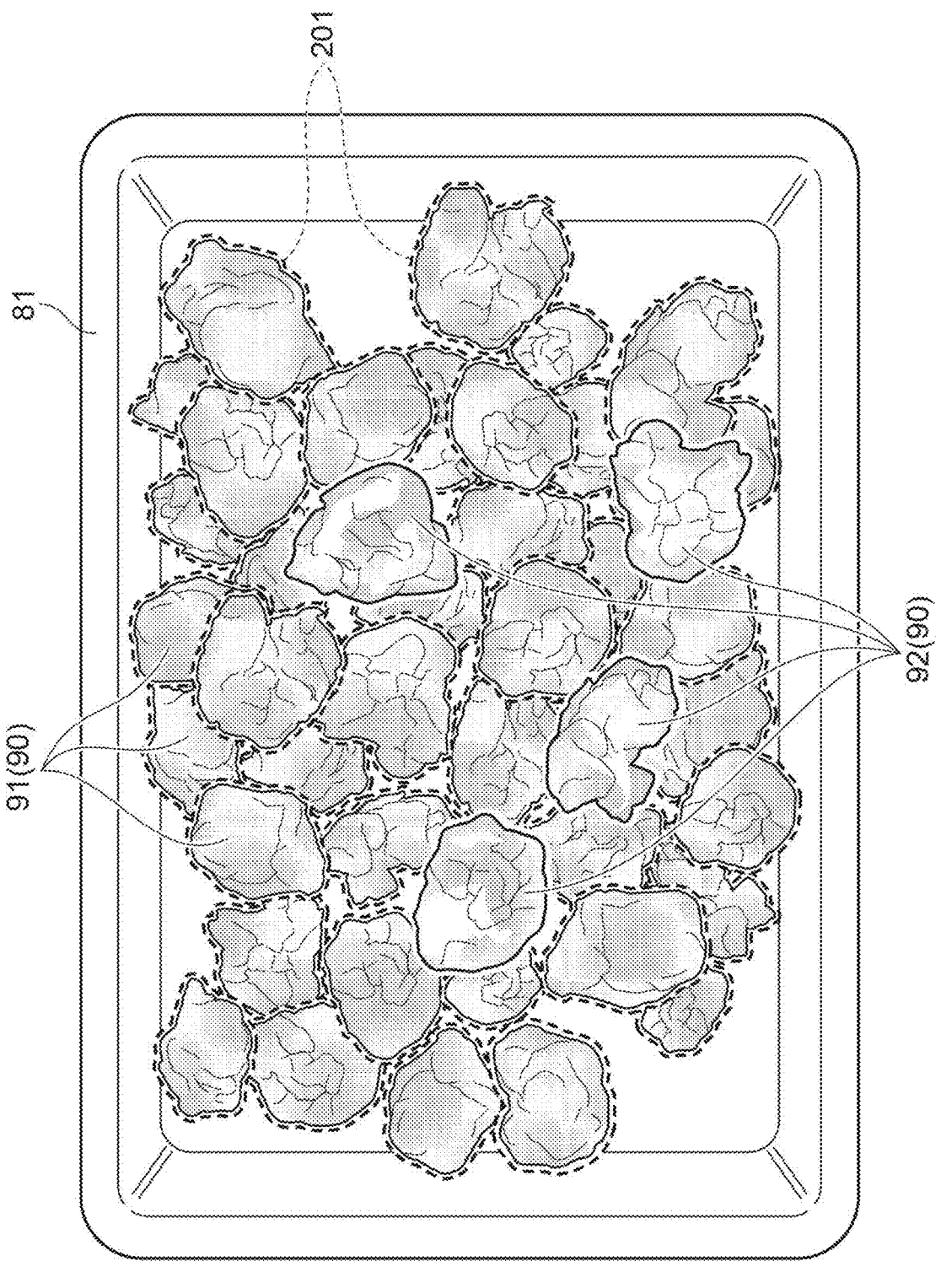
FIG. 7 is a diagram showing an example of detection of candidate objects.

FIG. 7 is a diagram showing an example of the detection of candidate objects executed by the candidate detection unit 12, and shows fried chicken as candidate objects 90. It may also be said that this figure represents a stock area image showing a plan view of the stock area 81 containing a plurality of candidate objects 90. The candidate detection unit 12 detects the outline of each the candidate object 90. Further, the candidate detection unit 12 calculates the evaluation value of quality of each candidate object 90 by the quality inference engine, divides the group of the candidate objects 90 into candidate objects 91 which meet the quality standard and candidate objects 92 which do not meet the quality standard, and excludes the candidate objects 92 from the target of selection. In the example of FIG. 7, the candidate objects 91 are pieces of deep-fried chicken whose entire surface is covered with batter, and the candidate objects 92 are pieces of deep-fried chicken whose batter is partially peeled off.

Returning to FIG. 4, in step S16, the placement planning unit 13 cooperates with the simulation evaluation unit 14 to execute placement planning by simulation. The simulation will be described in detail with reference to FIG. 5.

In step S161, the placement planning unit 13 virtually places at least one additional object in the designated area 82 to generate a predicted area state. That is, the placement planning unit 13 simulates the predicted area state. In the simulation, the placement planning unit 13 virtually reproduces the current area state of the designated area 82 and the set of candidate objects in the stock area 81, and generates the predicted area state in the reproduced environment. The placement planning unit 13 virtually selects at least one additional object from the set of candidate objects and virtually places the one additional object in the designated area 82 under the current area state. The placement planning unit 13 selects a candidate object that meets the quality standard as the additional object. That is, the placement planning unit 13 selects the additional object from the plurality of candidate objects having the quality that meets the quality standard. In some examples, the placement planning unit 13 selects the additional object based on at least one of the empty portion in the designated area 82 and the attribute (e.g., outline or color) of each candidate object. For example, the placement planning unit 13 may select an additional object based on the outline such that objects do not overlap in the designated area 82. Alternatively, the placement planning unit 13 may select an additional object such that the color balance of one or more objects in the designated area 82 meets a given standard (e.g., such that there are multiple color grades in the designated area 82).

In some examples, the placement planning unit 13 generates a state of the designated area 82 in which a predetermined amount of objects including the additional object are placed, as the predicted area state. In this simulation, the placement planning unit 13 virtually repeats the placement of additional objects until the designated area 82 contains the predetermined amount of objects. For example, it is assumed that the current area state indicates the empty designated area 82 and the predetermined amount is "5". In this case, the placement planning unit 13 virtually places five additional objects from the stock area 81 to the designated area 82 to generate the predicted area state. As another example, it is assumed that the current area state indicates the designated area 82 containing three objects, and the predetermined amount is "5". In this case, the placement planning unit 13 virtually places two additional objects from the stock area 81 to the designated area 82 to generate the predicted area state.

In step S162, the placement planning unit 13 predicts total mass corresponding to the predicted area state generated. The total mass is a total value of the mass of the objects corresponding to the predetermined amount and may be different from the predetermined amount. For example, the placement planning unit 13 estimates, for each of one or more objects in the designated area 82, the volume of the object from the number of pixels representing the object, and multiplies a predetermined density by the volume to predict the mass of the object. The placement planning unit 13 then calculates the total mass of one or more objects in the designated area 82.

In step S163, the simulation evaluation unit 14 evaluates the predicted area state generated by the placement inference engine. It may be said that this process is evaluation of the simulation result. The simulation evaluation unit 14 inputs an image indicating the predicted area state (i.e., one or more objects virtually placed in the designated area 82) into the placement inference engine, and obtains an evaluation value of the predicted area state.

In step S164, the simulation evaluation unit 14 calculates a degree of interference between the objects in the designated area 82 under the predicted area state generated. The degree of interference is an indicator indicating how much objects overlap each other, and indicates, for example, a degree of overlap between objects in a plan view of the designated area 82. The degree of interference may be at least part of the evaluation of the predicted area state. In some examples, the simulation evaluation unit 14 detects or estimates the outline of each object in the designated area 82 and calculates the degree of interference between adjacent objects. Taking two adjacent objects as an example, the degree of interference is 0 in a case where the entire outlines of both objects is seen in the plan view of the designated area 82, and the degree of interference is larger than 0 in a case where part of the outline of one object is hidden by the outline of the other object. The simulation evaluation unit 14 calculates the degree of interference in the whole of the designated area 82. For example, the simulation evaluation unit 14 may calculate a total value of the square measures of the portions of the objects hidden by the overlap (this is referred to as the total overlap square measure), as the degree of interference. Alternatively, the simulation evaluation unit 14 may calculate a ratio of the total overlapping square measure to the square measure of the designated area 82, as the degree of interference.

In step S165, the placement planning unit 13 determines whether to terminate the generation of a new predicted area state. In a case where the new predicted area state is to be generated (YES in step S165), the processing of steps S161-S164 is repeated. That is, the placement planning unit 13 simulates a plurality of predicted area states for one current area state, and the simulation evaluation unit 14 evaluates each of the plurality of predicted area states.

In a case where the generation of the new predicted area state is terminated (NO in step S165), the processing proceeds to step S166. For example, the placement planning unit 13 may terminate the generation of the predicted area state in response to generating a predetermined number of predicted area states.

In step S166, the placement planning unit 13 selects one from the plurality of predicted area states. In some examples, the placement planning unit 13 selects one predicted area state based on at least one of the evaluation value, the degree of interference, and the total mass. For example, the placement planning unit 13 may calculate an evaluation score that increases as the evaluation value increases, an inference score that increases as the degree of inference decreases, and a mass score that increases as a difference between the total mass and the predetermined amount decreases, and select a predicted area state with the highest total value of these three scores. Alternatively, the placement planning unit 13 may select a predicted area state with the highest total value of any two of the three scores. Alternatively, the placement planning unit 13 may select a predicted area state with the highest evaluation value, a predicted area state with the lowest degree of interference, or a predicted area state whose total mass is closest to the predetermined amount.

Referring back to FIG. 4, in step S17, the object information generation unit 15 generates object information on the additional object based on the predicted area state which reflects the current area state and is obtained by the placement planning. The object information generation unit 15 generates the object information based on the one predicted area state selected. The object information generation unit 15 selects one of the at least one additional object in the predicted area state, and selects the additional object from the plurality of candidate objects in the real stock area 81. The object information generation unit 15 determines at least one of a position and a posture of the selected additional object in the real designated area 82. For example, the object information generation unit 15 adopts the position and posture of the additional object in the predicted area state, as the position and posture of the additional object in the real designated area 82. In some examples, the object information generation unit 15 generates object information indicating the selected additional object, the picking point of the additional object in the real stock area 81, and the position or posture of the additional object in the real designated area 82.

In step S18, the robot control unit 20 controls the robot 3 based on the object information to cause the robot 3 to physically place the additional object in the designated area 82. For example, the robot control unit 20 controls the robot 3 so as to physically place the additional object in the designated area 82 in accordance with the at least one of the position and the posture indicated by the object information. The robot control unit 20 generates a path, which is a trajectory of the robot 3 or end effector 4 for placing the selected additional object from the real stock area 81 to the real designated area 82, based on the object information and the current area state. The path includes a section from the position of the additional object in the stock area 81 to the planned placement position in the designated area 82. The robot control unit 20 generates a path such that the robot 3 or end effector 4 does not interfere with an obstacle in that section. Examples of the obstacle include an object that defines the stock area 81 (e.g., the food container), an object that defines the designated area 82 (e.g., the pack), and an object that is already located (or placed) in the designated area 82. The robot control unit 20 generates a series of control signals for operating the robot 3 or end effector 4 along the generated path, and sequentially outputs the control signals to the motor control device 2. The motor control device 2 sequentially generates electric power for moving the motor based on the control signals, and sequentially supplies the electric power to the motor. As a result, the robot 3 takes out the selected additional object from the real stock area 81 and places the additional object in the real designated area 82 according to a predetermined position or posture.

Figure 8:
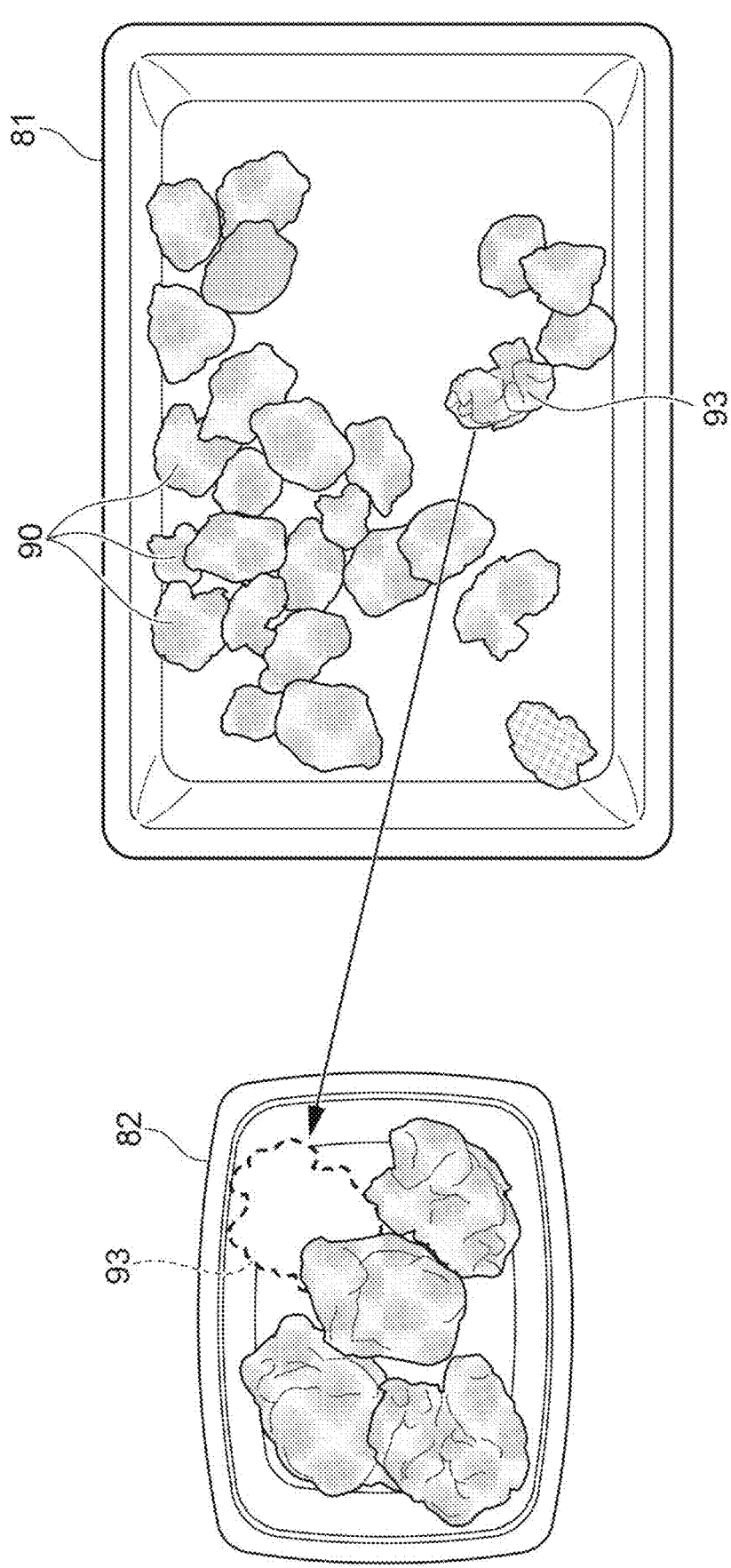
FIG. 8 is a diagram showing an example of a placement of an additional object in the designated area.

FIG. 8 is a diagram showing an example of the placement of additional object in the designated area. In this example, the object information generation unit 15 selects one of the set of the candidate objects 90 in real the stock area 81 as an additional object 93 (the fifth object to be placed in the designated area 82), based on the predicted area state selected by the placement planning. The object information generation unit 15 determines the position and posture of the additional object 93 in the designated area 82. In the example of FIG. 8, the predicted area state is generated based on the current area state indicating that the upper right portion of the designated area 82 is unoccupied, and the object information generation unit 15 positions the additional object 93 in the empty portion. The object information generation unit 15 generates the object information on the additional object 93, the robot control unit 20 controls the robot 3 based on the object information, and the robot 3 places the additional object 93 from the stock area 81 to the designated area 82. It should be noted that the arrow shown in FIG. 8 conceptually indicate the movement of the additional object 93 and is not necessarily the path of the robot 3 or end effector 4.

Returning back to FIG. 4, in step S19, the iteration control unit 16 determines whether to add another object to the designated area 82. In some examples, the iteration control unit 16 estimates a difference between the total amount of one or more objects in the designated area 82 and the predetermined amount, and determines to add another object if the difference is equal to or greater than a predetermined threshold (i.e., if the total amount of objects in the designated area 82 is insufficient). If the difference is less than the predetermined value, the iteration control unit 16 determines to terminate the addition of object.

In a case where another object is to be added (YES in step S19), the processing of steps S11-S18 is repeated. That is, each time an additional object is placed in the designated area 82 by the robot 3, the iteration control unit 16 causes the functional module group consisting of the area detection unit 11, the candidate detection unit 12, the placement planning unit 13, the simulation evaluation unit 14, and the object information generation unit 15 to execute the processing of steps S11-S18.

In the iteration, the area detection unit 11 acquires a new designated area image from the second camera 6 (step S11), and the candidate detection unit 12 acquires a new stock area image from the first camera 5 (step S12). The area detection unit 11 detects the current state of the designated area 82 as the current area state based on the new designated area image (step S13). This current area state indicates the designated area 82 in which the additional object is placed in step S18.

The candidate detection unit 12 detects a plurality of candidate objects in the stock area 81 based on the new stock area image (step S14), and excludes a candidate object that does not meet the quality standard from the target of selection (step S15). In response to one candidate object is taken out from the stock area 81 in step S18, the candidate object that has not been captured in the previous step S14 may appear in the stock area image, or a position or posture of at least one candidate object in the stock area 81 may change. By repeating steps S14 and S15, the current situation of the stock area 81 may be detected and a candidate object may be selected appropriately.

The placement planning unit 13 cooperates with the simulation evaluation unit 14 to execute the placement planning by simulation (step S16). The placement planning unit 13 generates a plurality of predicted area states, the simulation evaluation unit 14 evaluates each predicted area state, and the placement planning unit 13 selects one of the plurality of predicted area states based on the evaluation. The predicted area state selected here may be the same as or different from the predicted area state selected in the previous placement planning. A reason why the selected predicted area state may change from the previous placement plan may be that a position or posture of at least one candidate object in the stock area 81 changes, or a position or posture of at least one object in the designated area 82 changes. The object information generation unit 15 generates next object information on an additional object to be added next to the designated area 82, based on the predicted area state obtained by the placement planning (step S17). The robot control unit 20 controls the robot 3 so as to physically place the next additional object in the designated area 82, based on the object information (step S18).

In a case where the addition of object is terminated (YES in step S19), the processing proceeds to step S20. In step S20, the iteration control unit 16 outputs a predetermined event signal to the actual placement evaluation unit 17, and the actual placement evaluation unit 17 executes a final check of placement in the designated area 82 in response to the event signal. The final check will be described in detail with reference to FIG. 6.

In step S201, the actual placement evaluation unit 17 evaluates the final state of the designated area 82 by the placement inference engine. This process may be said to be an evaluation of the actual placement of the predetermined amount of objects. In some examples, the actual placement evaluation unit 17 acquires a designated area image of the final state from the second camera 6. Since the designated area image shows the current state of the designated area 82, it may be said that the final state of the designated area 82 is the current area state. The actual placement evaluation unit 17 inputs the designated area image into the placement inference engine to obtain an evaluation value of the final state.

In step S202, the analysis unit 18 analyzes a calculation process of the placement inference engine in that evaluation to extract an area of interest indicating the basis of the evaluation by the placement inference engine. In some examples, the analysis unit 18 extracts, as the area of interest, an inappropriate portion that has caused a decrease in the evaluation value of the final state, in the designated area 82. Examples of the inappropriate portion include an empty portion and a portion where objects overlap each other.

In a case of analyzing the calculation process of the inference engine including the neural network, the analysis unit 18 may extract the area of interest by using the class activation mapping (CAM). The CAM is a method of identifying the basis of determination by a neural network based on a feature map and a weight corresponding to an edge from the global average pooling (GAP) to a detected class. The analysis unit 18 may use the Gradient-weighted CAM (Grad-CAM). The Grad-CAM is a method of substituting the weight used in the calculation of the CAM with the gradient at the back propagation, and thus, the basis of determination may be identified in various types of neural networks. The analysis unit 18 may use the Grad-CAM++, Score-CAM, Ablation-CAM, Eigen-CAM, or Integrated Grad-CAM.

In step S203, the actual placement evaluation unit 17 determines whether to adjust the placement. In some examples, the actual placement evaluation unit 17 determines to adjust the placement in a case where the evaluation value output from the placement inference engine is "bad", and determines not to adjust the placement in a case the evaluation value is "good". Alternatively, the actual placement evaluation unit 17 may determine to adjust the placement in a case where the evaluation value output from the placement inference engine is less than a predetermined value, and determine not to adjust the placement in a case where the evaluation value is equal to or greater than the predetermined value. In some examples, in a case of determining that the placement is to be adjusted, the ratio of the area of interest to the designated area 82 becomes relatively large.

In a case of adjusting the placement (YES in step S203), the processing proceeds to step S204. In step S204, the adjustment information generation unit 19 generates adjustment information for adjusting the placement. The adjustment information is generated for the purpose of increasing a result of evaluation (that is, the evaluation value) executed by the actual placement evaluation unit 17 using the placement inference engine, and is used, for example, to place the predetermined amount of objects in the designated area 82 in a more balanced manner.

In some examples, the adjustment information generation unit 19 identifies a partial area corresponding to the area of interest, from the designated area 82. The adjustment information generation unit 19 may identify the partial area that matches the area of interest, identify the area of interest and its periphery as the partial area, or identify part of the area of interest as the partial area. In any case, the partial area is a real area in the designated area 82.

The adjustment information generation unit 19 generates the adjustment information based at least on the position of the partial area. In some examples, the area of interest and the partial area indicate the empty portion in which no object is positioned, and the adjustment information generation unit 19 generates the adjustment information for positioning part of the predetermined amount of objects in the empty portion. For example, the adjustment information generation unit 19 selects one object adjacent to the partial area, and sets at least one of the position and posture of the object such that at least part of the object enters the partial area. In another example, the area of interest and the partial area indicate where two objects overlap, and the adjustment information generation unit 19 generates the adjustment information to eliminate or reduce the overlap. For example, the adjustment information generation unit 19 selects one of the two overlapping objects and sets at least one of the position and posture of the selected object such that the selected object is away from the other object. In some examples, the adjustment information generation unit 19 generates the object information indicating the selected object, the picking point of that object in the real designated area 82, and the set position or posture of the object.

In step S205, the robot control unit 20 controls the robot 3 based on the adjustment information to cause the robot 3 to physically change the position or posture of the selected object. The robot control unit 20 generates a path of the robot 3 or end effector 4 for changing the current position or posture of the selected object to the set position or posture, based on the adjustment information and the current area state. That path includes a section from the current position to the set position for that object. The robot control unit 20 generates a path such that the robot 3 or end effector 4 does not interfere with an obstacle (e.g., an object that defines the designated area 82, and other objects) in that section. The robot control unit 20 generates a series of control signals for operating the robot 3 or end effector 4 along the generated path, and sequentially outputs the control signals to the motor control device 2. The motor control device 2 sequentially generates the electric power for moving the motor, based on the control signals, and sequentially supplies the electric power to the motor. As a result, the robot 3 changes at least one of the position and posture of the selected object in the real designated area 82. For example, the robot 3 moves that object such that at least part of the object enters the partial area. In another example, the robot 3 moves one object such that the overlap between two adjacent objects is reduced.

After step S205, the processing returns to step S201, and the processing of steps S201-S203 is executed again. The actual placement evaluation unit 17 evaluates, by the placement inference engine, the current area state (i.e., the changed final state) of the designated area 82 in which the placement of at least part of the predetermined amount of objects has been adjusted (step S201). The analysis unit 18 analyzes the calculation process of the placement inference engine in that evaluation to extract the area of interest (step S202). The actual placement evaluation unit 17 determines whether to further adjust the placement in the designated area 82 (step S203).

In a case where the placement is not to be adjusted (NO in step S203), the processing proceeds to step S206. In step S206, the actual placement evaluation unit 17 fixes the placement in the designated area 82. As a result, the robot system 1 (or the robot controller 10) terminates the processing for one designated area 82. The designated area 82 containing the predetermined amount of objects is automatically or manually moved from the working space to another predetermined location.

The robot system 1 may execute the processing flow S1 repeatedly. For example, in a case where the object is a food item and the designated area 82 is a pack, the robot system 1 may repeatedly execute the processing of placing a predetermined amount of food in an empty pack. By this iteration, a pack containing the predetermined amount of food is obtained as a final or intermediate product.

Figure 9:
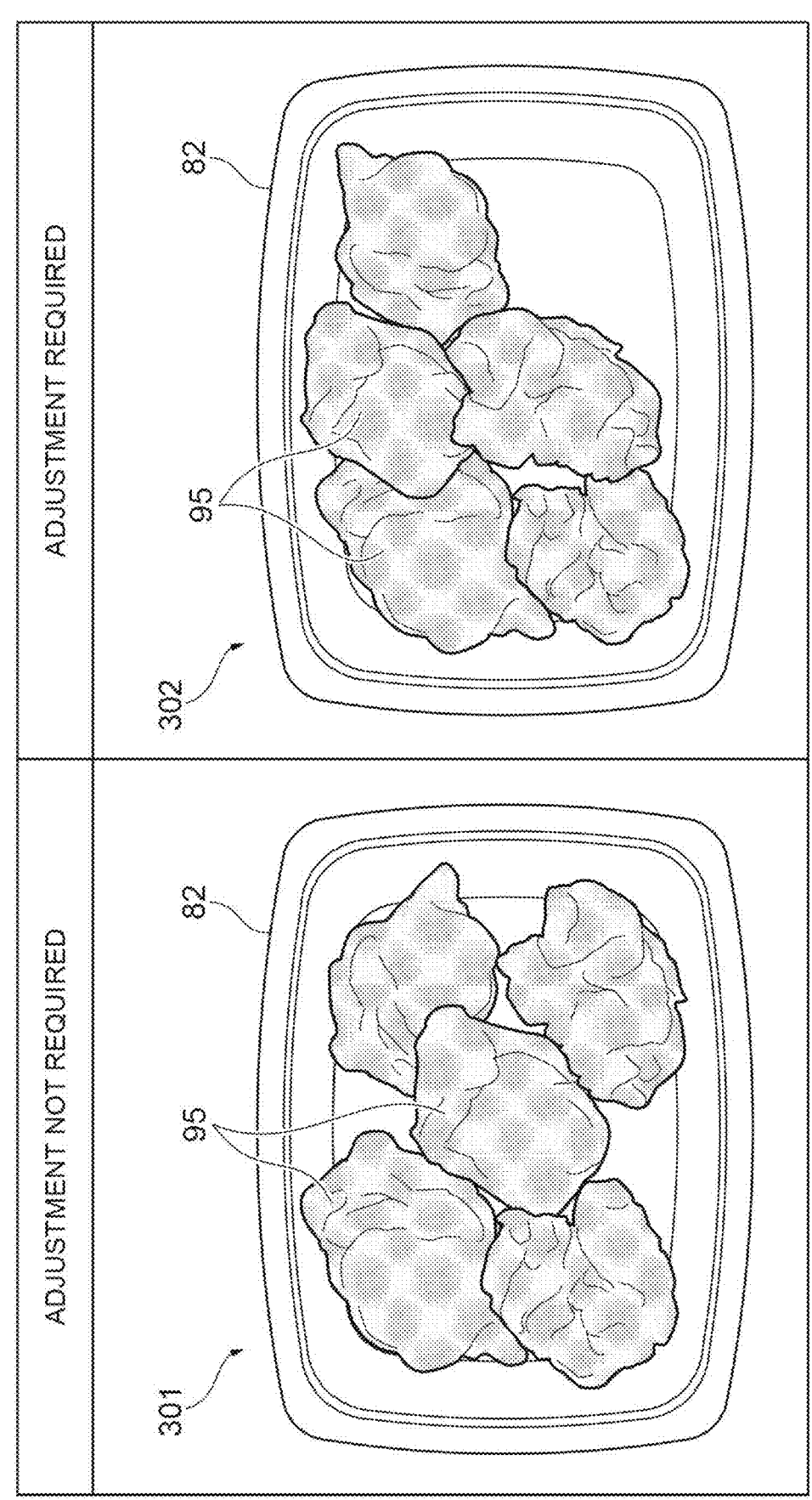
FIG. 9 is a diagram showing an example of a final state of the designated area.

FIG. 9 is a diagram showing two examples of final state of the designated area 82. In both examples, the object is fried chicken, and the final state is a state in which five pieces of fried chicken are placed in the designated area 82. Therefore, the predetermined amount of objects is five pieces of fried chicken. In a final state 301, five objects 95 are placed in a balanced manner over the whole of the designated area 82, and in this case, the actual placement evaluation unit 17 determines not to adjust the placement. On the other hand, in a final state 302, the lower right portion of the designated area 82 is largely empty. In this case, the actual placement evaluation unit 17 determines to adjust the placement, and the analysis unit 18 extracts the lower right portion as the area of interest. The adjustment information generation unit 19 identifies a partial area corresponding to the area of interest (e.g., the lower right portion) from the designated area 82 and generates the adjustment information for moving the at least one object 95 toward the partial area.

As described above, a robot control system according to an aspect of the present disclosure includes circuitry configured to: acquire, from an imaging device that images a designated area in which at least one object is to be placed, a designated area image showing the designated area; execute image analysis on the designated area image to detect a current state of the designated area as a current area state; generate, based on the current area state, a state of the designated area which simulates one or more objects including an additional object as having been placed in the designated area, as a predicted area state; generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information.

A method for controlling a robot according to an aspect of the present disclosure includes: acquiring, from an imaging device that images a designated area in which at least one object is to be placed, a designated area image showing the designated area; executing image analysis on the designated area image to detect a current state of the designated area as a current area state; generating, based on the current area state, a state of the designated area which simulates one or more objects including an additional object as having been placed in the designated area, as a predicted area state; generating object information on the additional object which is simulated in the designated area, based on the predicted area state, wherein the object information indicates a position or a posture of the additional object in the predicted area state; and controlling a robot so as to physically place the additional object in the designated area in accordance with the position or the posture indicated by the object information.

A non-transitory computer-readable storage medium according to an aspect of the present disclosure stores processor-executable instructions to: acquire, from an imaging device that images a designated area in which at least one object is to be placed, a designated area image showing the designated area; execute image analysis on the designated area image to detect a current state of the designated area as a current area state; generate, based on the current area state, a state of the designated area which simulates one or more objects including an additional object as having been placed in the designated area, as a predicted area state; generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information.

In such aspects, since the additional object is placed in the designated area based on the current state of the designated area, an appropriate object may be appropriately placed in the designated area. For example, in consideration of the shape, volume, or square measure of an empty portion of the designated area, an object that is expected to be appropriately placed in the empty portion may be placed as the additional object. In another example, an object having an irregular shape may be placed appropriately or an operation in which a determination criterion is ambiguous may be automated.

In some examples, the circuitry may be configured to generate the predicted area state by simulation based on the current area state. The state of the designated area to which the object has been added is predicted as the predicted area state by the simulation, and the object information is generated based on that prediction. By introducing that simulation, an appropriate additional object may be determined more accurately and the additional object may be placed in the designated area. In some examples, the circuitry may be configured to: evaluate each of a plurality of the predicted area states simulated; select one of the plurality of predicted area states based on a result of the evaluation; and generate the object information based on the selected one predicted area state. By evaluating each of the plurality of predicted area states, the additional object which is objectively expected to be appropriate may be determined more accurately.

In some examples, the circuitry may be configured to use an inference engine learned in advance based on a plurality of post-placement area states in which at least one object is placed in the designated area, in order to evaluate each of the plurality of predicted area states. In this case, the sensitivity of person may be reflected in the inference engine, and thus the robot may perform a work based on the sensitivity of person. Therefore, the additional object may be automatically placed in the same manner as a manual operation.

In some examples, the inference engine may be learned in advance using a plurality of placement images indicating the plurality of post-placement area states and a plurality of evaluation values of placement, each of the plurality of evaluation values of placement corresponding to each of the plurality of placement images, and the circuitry may be configured to input each of a plurality of images indicating the plurality of predicted area states to the inference engine to calculate the evaluation value for each of the plurality of predicted area states.

In some examples, the plurality of evaluation values of placement used to learn the inference engine may be set based on a color balance between objects in the designated area.

In some examples, the color balance may be a balance of colors represented by a plurality of grades.

In some examples, the inference engine may be a machine learning model constructed by a neural network.

In some examples, the circuitry may be configured to simulate, as the predicted area state, a state of the designated area in which a predetermined amount of objects including the additional object has been placed. Since the object information is generated based on the prediction of the final state of the designated area, the predetermined amount of objects may be appropriately placed in the designated area. That is, an appropriate final state of the designated area may be provided. For example, food may be appropriately placed in a pack.

In some examples, the circuitry may be configured to predict a mass of the additional object and simulate the predicted area state based on the mass. By predicting the mass of the additional object, the predicted area state may be simulated in more detail. As a result, the predetermined amount of objects may be more reliably placed in the designated area.

In some examples, the circuitry may be configured to: predict a total mass of the one or more objects in the designated area, for each of the plurality of predicted area states; calculate, for each of the plurality of predicted area states, a total value of a mass score that increases as a difference between the total mass and a predetermined amount decreases and an evaluation score that increases as the evaluation value increases; and select the one predicted area state from the plurality of predicted area states based on a plurality of the total values.

In some examples, the circuitry may be configured to: determine the position and the posture of the additional object simulated in the designated area based on the current area state; generate the object information indicating the position and the posture of the additional object; and control the robot so as to place the additional object in the designated area in accordance with the position and the posture indicated by the object information. Since the position or posture of the additional object in the designated area is determined based on the current area state, the additional object may be more appropriately placed in the designated area. For example, the additional object may be placed in the designated area with a good appearance.

In some examples, the circuitry may be configured to: detect a plurality of candidate objects for the additional object; determine which of the plurality of candidate objects has a quality that meets a predetermined quality standard; select the additional object from the plurality of candidate objects having the quality that meets the quality standard; and generate the object information indicating the selected additional object. Since the additional object is selected based on the plurality of detected candidate objects, an appropriate additional object may be placed in the designated area. In addition, the quality of the objects placed in the designated area may be guaranteed.

In some examples, the circuitry may be configured to repeat the placing the additional object in the designated area, such that a predetermined amount of objects is placed in the designated area, and the circuitry may be configured to, each time the additional object is placed by the robot: detect the current area state; generate next object information on a next additional object to be added to the designated area; and control the robot so as to place the next additional object in the designated area. With this configuration, in response to a certain additional object being placed in the designated area, that is, based on the latest state of the designated area, another additional object may be appropriately placed in the designated area.

In some examples, the circuitry may be configured to further evaluate a final state that is a state of the designated area in which a predetermined amount of the objects is placed; generate, based on the final state, adjustment information for changing, in the designated area, a position or a posture of at least part of the predetermined amount of objects, such that the result of the evaluation is increased; and control the robot based on the adjustment information. In addition to the evaluation of the predicted area state, the state of the designated area after the predetermined amount of object is placed (i.e., final state) is further evaluated, so that the placement of object may be doubly confirmed. In addition, the configuration of the robot control system may be simplified by preparing the evaluation unit for executing those two types of evaluation. Furthermore, since the position or posture of the object in the designated area is automatically adjusted in accordance with the result of the evaluation of the final state, the object may be more appropriately placed in the designated area.

In some examples, the circuitry may be configured to: analyze a calculation process of an inference engine used in the evaluation to extract an area of interest indicating a basis of the evaluation of the final state by the inference engine; identify a partial area corresponding to the area of interest from the designated area; and generate the adjustment information based at least on a position of the partial area. With this configuration, an object to be adjusted may be appropriately selected, and the object may be adjusted more appropriately.

In some examples, the method may further include: generating the predicted area state by simulation based on the current area state; evaluating each of a plurality of the predicted area states simulated; selecting one of the plurality of predicted area states based on a result of the evaluation; and generating the object information based on the selected one predicted area state. The state of the designated area to which the object has been added is predicted as the predicted area state by the simulation, and the object information is generated based on that prediction. By introducing that simulation, an appropriate additional object may be determined more accurately and the additional object may be placed in the designated area. Furthermore, by evaluating each of the plurality of predicted area states, the additional object which is objectively expected to be appropriate may be determined more accurately.

In some examples, an inference engine learned in advance based on a plurality of post-placement area states in which at least one object is placed in the designated area, may be used to evaluate each of the plurality of predicted area states. In this case, the sensitivity of person may be reflected in the inference engine, and thus the robot may perform a work based on the sensitivity of person. Therefore, the additional object may be automatically placed in the same manner as a manual operation.

In some examples, the non-transitory computer-readable storage medium may further include instruction to: generate the predicted area state by simulation based on the current area state; evaluate each of a plurality of the predicted area states simulated; select one of the plurality of predicted area states based on a result of the evaluation; and generate the object information based on the selected one predicted area state, and an inference engine learned in advance based on a plurality of post-placement area states in which at least one object is placed in the designated area, may be used to evaluate each of the plurality of predicted area states. The state of the designated area to which the object has been added is predicted as the predicted area state by the simulation, and the object information is generated based on that prediction. By introducing that simulation, an appropriate additional object may be determined more accurately and the additional object may be placed in the designated area. Furthermore, by evaluating each of the plurality of predicted area states, the additional object which is objectively expected to be appropriate may be determined more accurately. In addition, the sensitivity of person may be reflected in the inference engine, and thus the robot may perform a work based on the sensitivity of person. Therefore, the additional object may be automatically placed in the same manner as a manual operation.

It is to be understood that not all aspects, advantages and features described herein may necessarily be achieved by, or included in, any one particular example. Indeed, having described and illustrated various examples herein, it should be apparent that other examples may be modified in arrangement and detail.

In some examples, the simulation evaluation unit 14 and the actual placement evaluation unit 17 use a common placement inference engine to evaluate a state of the designated area 82. In this case, the difference between these two functional modules is whether the image input into the placement inference engine shows the predicted area state (virtual placement) or the actual placement. Therefore, these two functional modules may be integrated into one evaluation unit.

The robot control system according to the present disclosure may be applied to a computer system or a device other than the robot controller. For example, the robot control system may be applied to a host controller that integrally manages one or more robot controllers.

The hardware configuration of the robot control system is not limited to a form in which each functional module is realized by executing a program. For example, at least part of the above-described functional modules may be configured by a logic circuit specialized for the function, or by an application specific integrated circuit (ASIC) in which the logic circuits are integrated.

The processing procedure of the method executed by at least one processor is not limited to the above-described examples. For example, some of the steps or processes described above may be omitted, or the steps may be executed in a different order. In addition, two or more steps of the above-described steps may be combined, and part of the steps may be corrected or deleted. Alternatively, other steps may be executed in addition to the above-described steps.

In step S15, the candidate detection unit 12 may cooperate with the robot control unit 20 to physically take out a candidate object that does not meet the quality standard from the stock area 81, as a substandard object. In some examples, the candidate detection unit 12 detects a picking point of a substandard object and generates removal information indicating the substandard object and the picking point. The robot control unit 20 controls the robot 3 based on the removal information and causes the robot 3 to move the substandard object to another location outside the stock area 81. As a matter of course, the destination of the substandard object is a place different from the designated area 82. By physically removing the substandard object, another candidate object hidden by the substandard object is exposed and may be detected by the candidate detection unit 12. As a result, there is a possibility that the number of options of additional object may increase.

Step S16 for obtaining the predicted area state indicating the designated area 82 in which the predetermined amount of objects are placed may be executed only once while the predetermined amount of objects are being placed in one designated area 82, that is, during one processing flow S1. In this case, the robot system 1 (or the robot controller 10) sequentially generates the object information for each additional object based on the predicted area state initially selected, and sequentially places the additional objects in the designated area 82.

In step S161, the placement planning unit 13 may generate a state of the designated area 82 in which one additional object is placed as the predicted area state. This predicted area state may indicate the designated area 82 that contains the predetermined amount of objects (i.e., the final state of the designated area 82), or be an intermediate state before reaching the final state. For example, it is assumed that the current area state indicates the designated area 82 containing two objects, and the predetermined amount is "5". In this case, the placement planning unit 13 virtually places one additional object from the stock area 81 to the designated area 82, and generates the predicted area state indicating the designated area 82 containing three objects.

The robot control system may generate the object information based on the current area state and control the robot based on the object information, without executing the placement planning (step S16) by the simulation. The robot control system may not execute the final check of placement (step S20).

In steps S205 and S206, the adjustment information generation unit 19 may generate the adjustment information for replacing at least one object in the designated area 82, and the robot control unit 20 may replace an object between the designated area 82 and the stock area 81 based on the adjustment information.

In step S20, steps S202-S207 may be omitted, and the actual placement evaluation unit 17 may display the evaluation result of the final state of the designated area 82 on a display device. Thus, the analysis unit 18 and the adjustment information generation unit 19 may be omitted. For example, the actual placement evaluation unit 17 displays the evaluation result in an expression format such as text or computer graphics (CG). In this case, the user may refer to the evaluation result to adjust the placement of the predetermined amount of objects in the designated area 82.

In a case where comparing the magnitude relationship between two numerical values in a computer system or a computer, either of the two criteria of "equal to or greater than" and "greater than" may be used, and either of the two criteria of "equal to or less than" and "less than" may be used.

We claim all modifications and variations coming within the spirit and scope of the subject matter claimed herein.

The following appendices are provided by way of further illustrative examples.

(Appendix 1) A robot control system comprising:
an area detection unit configured to detect a current state of a designated area in which at least one object is to be placed, as a current area state;
a generation unit configured to generate object information on an additional object to be added to the designated area, based on the current area state; and
a robot control unit configured to control a robot so as to place the additional object in the designated area, based on the object information.

(Appendix 2) The robot control system according to Appendix 1, further comprising a planning unit configured to simulate, based on at least the current area state, a state of the designated area in which at least the additional object has been placed, as a predicted area state,
wherein the generation unit is configured to generate the object information based on the predicted area state.

(Appendix 3) The robot control system according to Appendix 2, further comprising an evaluation unit configured to evaluate each of a plurality of the predicted area states simulated by the planning unit,
wherein the planning unit is configured to select one predicted area state based on an evaluation result by the evaluation unit, and
wherein the generation unit is configured to generate the object information based on the one predicted area state selected.

(Appendix 4) The robot control system according to Appendix 3, wherein the evaluation unit is configured to use an inference engine trained in advance based on a plurality of post-placement area states, each of which is a state in which at least one object has been placed in the designated area, in order to evaluate each of the plurality of predicted area states.

(Appendix 5) The robot control system according to any one of Appendices 2 to 4, wherein the planning unit is configured to simulate, as the predicted area state, a state of the designated area in which a predetermined amount of objects including the additional object has been placed.

(Appendix 6) The robot control system according to Appendix 5, wherein the planning unit is configured to predict a mass of the additional object and simulate the predicted area state based on the mass.

(Appendix 7) The robot control system according to any one of Appendices 1 to 6, wherein the generation unit is configured to:
determine at least one of a position and a posture of the additional object in the designated area based on the current area state; and
generate the object information indicating at least one of the determined position and the determined posture.

(Appendix 8) The robot control system according to any one of Appendices 1 to 7, further comprising a candidate detection unit configured to detect a plurality of candidate objects which are candidates for the additional object,
wherein the generation unit is configured to:
select the additional object based on the plurality of candidate objects; and
generate the object information indicating the selected additional object.

(Appendix 9) The robot control system according to Appendix 8, wherein the candidate detection unit is configured to:
determine, for each of the plurality of candidate objects, whether a quality of the candidate object meets a predetermined quality standard; and
excluding the candidate object that does not meet the quality standard from a target of the selection by the generation unit.

(Appendix 10) The robot control system according to any one of Appendices 1 to 9, further comprising an iteration control unit configured to repeat the placing the additional object in the designated area, such that a predetermined amount of objects is placed in the designated area,
wherein the iteration control unit is configured to, each time the additional object is placed by the robot:
cause the area detection unit to detect the current area state;
cause the generation unit to generate next object information on a next additional object to be added to the designated area; and
cause the robot control unit to control the robot so as to place the next additional object in the designated area.

(Appendix 11) The robot control system according to Appendix 3, wherein the evaluation unit is configured to further evaluate a final state that is a state of the designated area in which the predetermined amount of objects is placed.

(Appendix 12) The robot control system according to Appendix 11, further comprising an adjustment unit configured to generate, based on the final state, adjustment information for changing, in the designated area, at least one of a position and a posture of at least part of the predetermined amount of objects, such that an evaluation result by the evaluation unit is increased,
wherein the robot control unit is configured to control the robot based on the adjustment information.

(Appendix 13) The robot control system according to Appendix 12, further comprising an analysis unit configured to analyze a calculation process of an inference engine used in the evaluation by the evaluation unit to extract an area of interest indicating a basis of the evaluation of the final state by the inference engine,
wherein the adjustment unit is configured to:
identify a partial area corresponding to the area of interest from the designated area; and
generate the adjustment information based at least on a position of the partial area.

(Appendix 14) A robot control method executed by a robot control system including at least one processor, the method comprising:
detecting a current state of a designated area in which at least one object is to be placed, as a current area state;
generating object information on an additional object to be added to the designated area, based on the current area state; and
controlling a robot so as to place the additional object in the designated area, based on the object information.

(Appendix 15) A robot control program for causing a computer to execute:

detecting a current state of a designated area in which at least one object is to be placed, as a current area state;

generating object information on an additional object to be added to the designated area, based on the current area state; and controlling a robot so as to place the additional object in the designated area, based on the object information.

What is claimed is:

1. A robot control system comprising circuitry configured to:

acquire, from an imaging device that images a designated area in which at least one object is to be placed, a designated area image showing the designated area;

execute image analysis on the designated area image to detect a current state of the designated area as a current area state;

generate, by simulation based on the current area state, a virtual state of the designated area which simulates one or more objects including an additional object as having been placed in the designated area, as a predicted area state;

generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information, wherein the circuitry is further configured to:

generate, for each of a plurality of predicted area states, a virtual image of the predicted area state by the simulation based on the current area state;

input, for each of the plurality of predicted area states, the virtual image of the predicted area state into an inference engine to obtain an evaluation value of the predicted area state, wherein the inference engine is configured to receive an input image and output the evaluation value for a subject depicted in the input image;

select one of the plurality of predicted area states based on the evaluation value of each of the plurality of the predicted area states; and generate the object information based on the selected one predicted area state.

2. The robot control system according to claim 1, wherein the inference engine is learned in advance using a plurality of placement images indicating the plurality of post-placement area states and a plurality of evaluation values of placement, wherein each of the plurality of evaluation values of placement corresponds to each of the plurality of placement images, and wherein the circuitry is configured to input each of a plurality of images indicating the plurality of predicted area states to the inference engine to calculate the evaluation value for each of the plurality of predicted area states.

3. The robot control system according to claim 2, wherein the plurality of evaluation values of placement used to learn the inference engine are set based on a color balance between objects in the designated area.

4. The robot control system according to claim 3, wherein the color balance is a balance of colors represented by a plurality of grades.

5. The robot control system according to claim 1, wherein the inference engine is a machine learning model constructed by a neural network.

6. The robot control system according to claim 1, wherein the circuitry is configured to simulate, as the predicted area state, a state of the designated area in which a predetermined amount of objects including the additional object has been placed.

7. The robot control system according to claim 6, wherein the circuitry is configured to predict a mass of the additional object and simulate the predicted area state based on the mass.

8. The robot control system according to claim 2, wherein the circuitry is configured to:

predict a total mass of the one or more objects in the designated area, for each of the plurality of predicted area states;

calculate, for each of the plurality of predicted area states, a total value of a mass score that increases as a difference between the total mass and a predetermined amount decreases and an evaluation score that increases as the evaluation value increases; and select the one predicted area state from the plurality of predicted area states based on a plurality of the total values.

9. The robot control system according to claim 1, wherein the circuitry is configured to:

determine the position and the posture of the additional object simulated in the designated area based on the current area state;

generate the object information indicating the position and the posture of the additional object; and control the robot so as to place the additional object in the designated area in accordance with the position and the posture indicated by the object information.

10. The robot control system according to claim 1, wherein the circuitry is configured to:

detect a plurality of candidate objects for the additional object;

determine which of the plurality of candidate objects has a quality that meets a predetermined quality standard;

select the additional object from the plurality of candidate objects having the quality that meets the quality standard; and generate the object information indicating the selected additional object.

11. The robot control system according to claim 1, wherein the circuitry is configured to:

further evaluate a final state that is a state of the designated area in which a predetermined amount of the objects is placed;

generate, based on the final state, adjustment information for changing, in the designated area, a position or a posture of at least part of the predetermined amount of objects, such that the result of the evaluation is increased; and control the robot based on the adjustment information.

12. The robot control system according to claim 11, wherein the circuitry is configured to:

analyze a calculation process of an inference engine used in the evaluation to extract an area of interest indicating a basis of the evaluation of the final state by the inference engine;

identify a partial area corresponding to the area of interest from the designated area; and generate the adjustment information based at least on a position of the partial area.

13. A method for controlling a robot, the method comprising:

acquiring, from an imaging device that images a designated area in which at least one object is to be placed, a designated area image showing the designated area;

executing image analysis on the designated area image to detect a current state of the designated area as a current area state;

generating, by simulation based on the current area state, a virtual state of the designated area which simulates one or more objects including an additional object as having been placed in the designated area, as a predicted area state;

generating object information on the additional object which is simulated in the designated area, based on the predicted area state, wherein the object information indicates a position or a posture of the additional object in the predicted area state; and controlling a robot so as to physically place the additional object in the designated area in accordance with the position or the posture indicated by the object information, wherein the method further comprises:

generating, for each of a plurality of predicted area states, a virtual image of the predicted area state by the simulation based on the current area state;

inputting, for each of the plurality of predicted area states, the virtual image of the predicted area state into an inference engine to obtain an evaluation value of the predicted area state, wherein the inference engine is configured to receive an input image and output the evaluation value for a subject depicted in the input image;

selecting one of the plurality of predicted area states based on the evaluation value of each of the plurality of the predicted area states; and generating the object information based on the selected one predicted area state.

14. A non-transitory computer-readable storage medium storing processor-executable instructions to:

acquire, from an imaging device that images a designated area in which at least one object is to be placed, a designated area image showing the designated area;

execute image analysis on the designated area image to detect a current state of the designated area as a current area state;

generate, by simulation based on the current area state, a virtual state of the designated area which simulates one or more objects including an additional object as having been placed in the designated area, as a predicted area state;

generate object information on the additional object which is simulated in the designated area, based on the predicted area state, wherein the object information indicates a position or a posture of the additional object in the predicted area state; and control a robot so as to physically place the additional object in the designated area in accordance with the position or the posture indicated by the object information, wherein the processor-executable instructions further cause at least one processor to:

generate, for each of a plurality of predicted area states, a virtual image of the predicted area state by the simulation based on the current area state;

input, for each of the plurality of predicted area states, the virtual image of the predicted area state into an inference engine to obtain an evaluation value of the predicted area state, wherein the inference engine is configured to receive an input image and output the evaluation value for a subject depicted in the input image;

select one of the plurality of predicted area states based on the evaluation value of each of the plurality of the predicted area states; and generate the object information based on the selected one predicted area state.

\* \* \* \* \*